Figure 1:
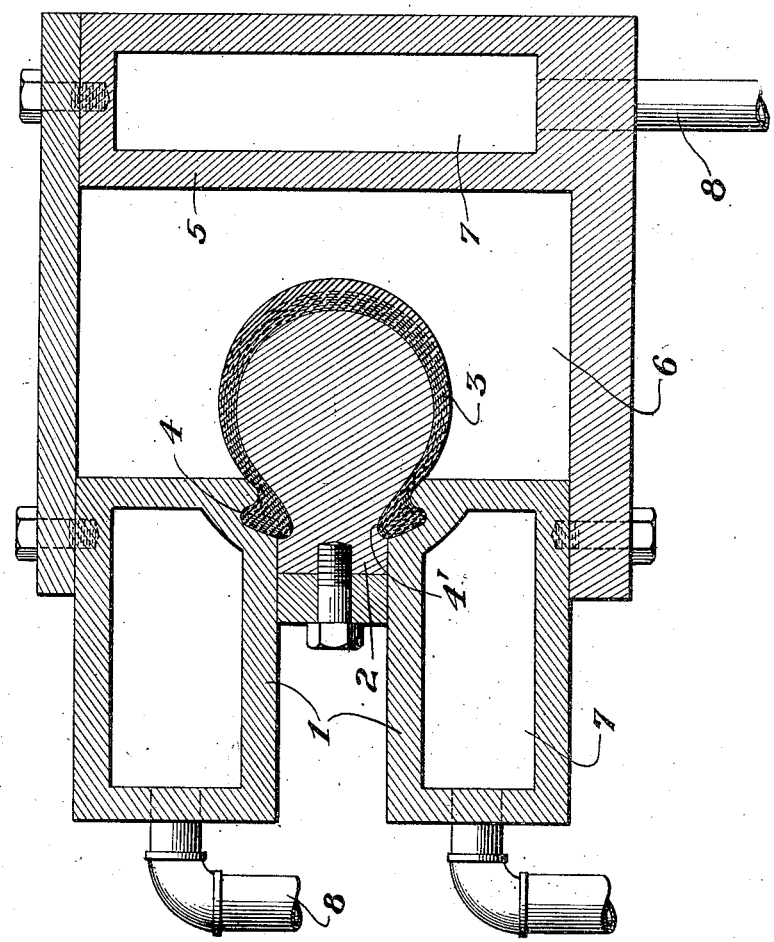

R. B. PRICE.
MANUFACTURE OF VULCANIZED ARTICLES.
APPLICATION FILED JAN. 14, 1915.

1,161,966.                               Patented Nov. 30, 1915.

Witnesses:
Veronica Braun
B. V. Mohan

Inventor
Raymond B. Price.
By his Attorney
Ernest Hopkinson

UNITED STATES PATENT OFFICE.

RAYMOND B. PRICE, OF NEW YORK, N. Y., ASSIGNOR TO RUBBER REGENERATING COMPANY, A CORPORATION OF INDIANA.

MANUFACTURE OF VULCANIZED ARTICLES.

1,161,966.  Specification of Letters Patent.  Patented Nov. 30, 1915.

Application filed January 14, 1915. Serial No. 2,094.

*To all whom it may concern:*

Be it known that I, RAYMOND B. PRICE, a citizen of the United States, residing at New York, county of New York, State of New York, have invented certain new and useful Improvements in the Manufacture of Vulcanized Articles, of which the following is a full, clear, and exact description.

This invention relates to the manufacture of vulcanized articles, and more particularly to tires, and has for its primary object the devising of an improved method of vulcanization, whereby the stretch given the fabric plies, the relative positions of the component parts, the exterior formation of the tire, and in fact any other similar characteristics existing before vulcanization will be maintained during the setting process.

It has been the usual practice to confine the tire within a mold during the vulcanizing process. The carcass of the tire is usually built upon a core with an endeavor to maintain a uniform degree of stretch of the fabric plies throughout. The degree of pressure required to close the mold sections about the tire, and the expansion of the rubber compound due to the heat of vulcanization, result in disrupting this uniformity of stretch and produce a variation in strains within the component parts of the tire in its heated condition so that when the tire takes a permanent set due to the vulcanization of the rubber, the various degrees of strain and stretch in the different portions of the tire are fixed in position and an inferior article is the result.

In the carrying out of my method I propose to vulcanize the tire by bringing its surface into intimate contact with a heat-conducting liquid in place of the rigid mold sections in order that there shall be no possibility of changing the previously existing conditions of the tire. It is essential in carrying out my invention that both the carcass and the tread of the tire be substantially formed before the application of it to the liquid bath. That is to say the liquid bath performs no function of shaping the article. The article may however be semi-cured in this bath in a partially shaped condition and then removed and finally shaped and the vulcanization completed in any desired manner, as for instance, by subjecting it to the action of molds and to the usual vulcanizing treatment. The carcass is usually composed of rubber compound and fabric or other fibrous material and is built on a ring core. The tread may be built in any manner desired, it being only essential that it be completely formed prior to my vulcanizing treatment. I prefer to build it upon a core or form which is in its exterior configuration and size substantially similar to that of the carcass. A mold may then be used to inclose the tread and to form thereon any design that may be desired. I also prefer to slightly cure the tread thus formed, after which it is removed from the mold and core and applied to the carcass which may also be partially cured, if desired. Or the carcass and tread may be subjected to my vulcanizing treatment separately and thereafter the two may be secured together by rubber cement, or in any other desired manner. Or a partial vulcanization may first be effected by my method and then the vulcanization completed in the usual manner by the use of molds or wrapping, or in any other known or preferred manner.

Broadly viewed, my invention is not limited to any particular manner of forming the tire, but contemplates the vulcanization of any style of tire by maintaining its surface in actual or intimate contact with a heat-conveying liquid for a period of time sufficient to effect the degree of vulcanization desired.

Figure 2:
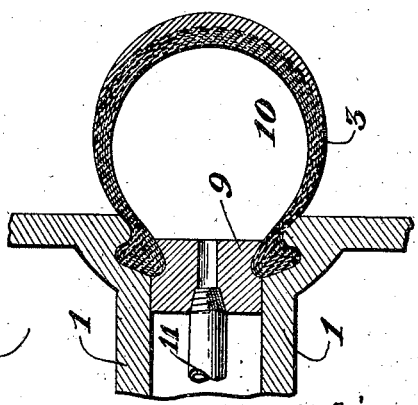

A somewhat conventional form of apparatus is shown in the drawings, suitable to the carrying out of my method, in which:

Figure 1 is a transverse sectional view of a type of vulcanizer suitable for the carrying out of my method; and Fig. 2 is a fragmentary view similar to Fig. 1, showing a modification thereof.

The vulcanizer as shown, comprises annular bead-shaping sections 1—1 disposed on either side of the ring core 2 which supports the tire 3. The sections are provided with annular channels 4, which coöperate with the bead channels 4' of the core for forming the beads of the tire and for supporting the tire during the vulcanizing process. The tire is inclosed by a casement 5, the upper wall of which being preferably made detachable by bolts, as shown, to serve as a cover. A chamber 6 is thus provided for holding the heat-conveying liquid medium and the sections 1, and the outer wall of the casement 5 is provided with steam-containing chambers 7 which are in communication with conduits 8, to supply or maintain the heat for vulcanization.

In the modification shown in Fig. 2, the core is dispensed with and an annular ring 9 substituted which coöperates with the bead-forming sections 1—1 to shape the beads and to hold the tire in position during the vulcanizing treatment. This construction provides a chamber 10 which is filled with the heat-conducting liquid, a pipe 11 being tapped into the ring 9 for filling the chamber.

In both constructions shown it will be noted that the bead portions of the tire are vulcanized by the heat conducted by the metal walls with which they are in direct contact. This is but a small portion of the tire however, and is not so injuriously affected by this means of vulcanization as the remainder of the tire. The remainder of the tire is freely suspended in midair with its surface free or unconfined so that it may be brought into actual contact with the heat-conveying liquid when the chamber 6 is filled. In fact it is not an essential of my invention that the beads be confined for when desired the entire article may be free from any confining or supporting member other than the surrounding liquid or receptacle containing same, so that its entire surface or any desired portion thereof will be in intimate contact with the liquid. And while I have described the process as applied to tires it is obvious that other articles may be subjected to the same vulcanizing process when desired.

It is desirable in the practice of my invention that a liquid be used for transmitting the heat of vulcanization having a boiling point above that of the vulcanizing heat, but I may if desired, use liquids of a lower boiling point at the atmospheric pressure and during the vulcanizing treatment subject them to a pressure sufficient to raise their boiling point above the vulcanizing heat. I have found that gylcerin may be advantageously used as the heat conveying liquid, but I do not wish to limit myself to any particular liquid, as many others may answer, it being only necessary that the liquid used should have no deleterious action upon the rubber. Gylcerin, however, has the advantage of imparting a smooth glossy surface finish to the rubber when vulcanized and has a boiling point at atmospheric pressure above that of the vulcanizing temperature, so that little or no heed need be paid to the application of pressure to this medium unless so desired.

What I claim and desire to protect by Letters Patent is:

1. The method of manufacturing tires which consists in assembling the vulcanizable plastic and fibrous material composing the tire, maintaining the surface thereof unconfined, and subjecting the tire to the action of a liquid brought into direct contact with the unconfined surface thereof and heated to the vulcanizing temperature.

2. The method of manufacturing tires which consists in building the tire of a vulcanizable plastic and fibrous material to a partially completed form maintaining the surface thereof unconfined, subjecting the tire to the action of a liquid brought into direct contact with the unconfined surface thereof and heated to the vulcanizing temperature for a period sufficient to partially vulcanize it and subsequent thereto completing its formation and vulcanization.

3. The method of manufacturing tires, which consists in first completing the tire of vulcanizable plastic and fibrous material to substantially its final form, then subjecting its bead portions to a restraining pressure and vulcanizing action of heated rigid walls while maintaining its surface unconfined and (simultaneously) subjecting the unconfined surface of the tire to the action of a heated liquid brought into direct contact with the outer surface of the tire.

4. The method of manufacturing tires, which consists in first completing the tire of vulcanizable plastic and fibrous material to substantially its final form and subsequently thereto subjecting it to the action of glycerin brought into intimate contact with the surface of the tire and heated to the vulcanizing temperature.

5. The method of manufacturing articles, which consists in building the article of vulcanizable plastic to substantially its final form while maintaining its surface unconfined, and subjecting said unconfined surface to the action of a liquid brought into direct contact with the unconfined surface of the article and heated to the vulcanizing temperature.

Signed at New York, county of New York, State of New York, this 12th day of January, 1915.

RAYMOND B. PRICE.

Witnesses:
C. M. SCHULE,
MARGARET A. MCLAUGHLIN.